Feb. 5, 1957 D. TEATINI 2,780,364
FILTER
Filed June 16, 1954 5 Sheets-Sheet 2

INVENTOR:
DARIO TEATINI
BY
ATTORNEY

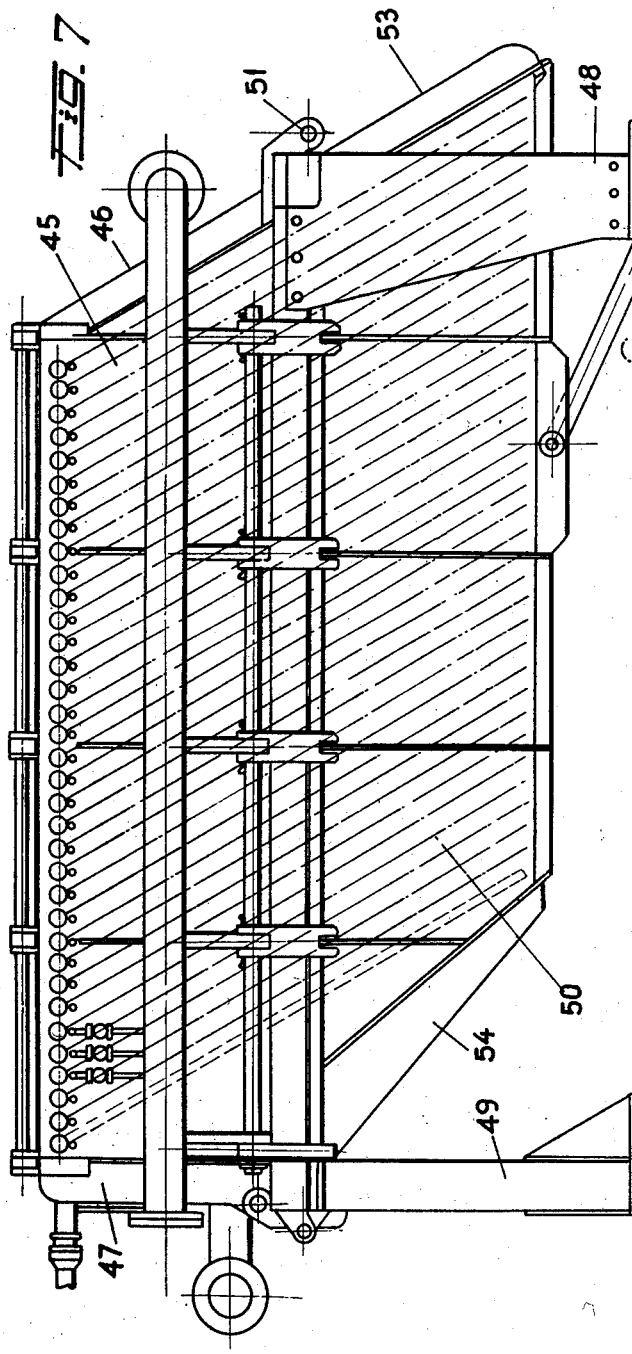

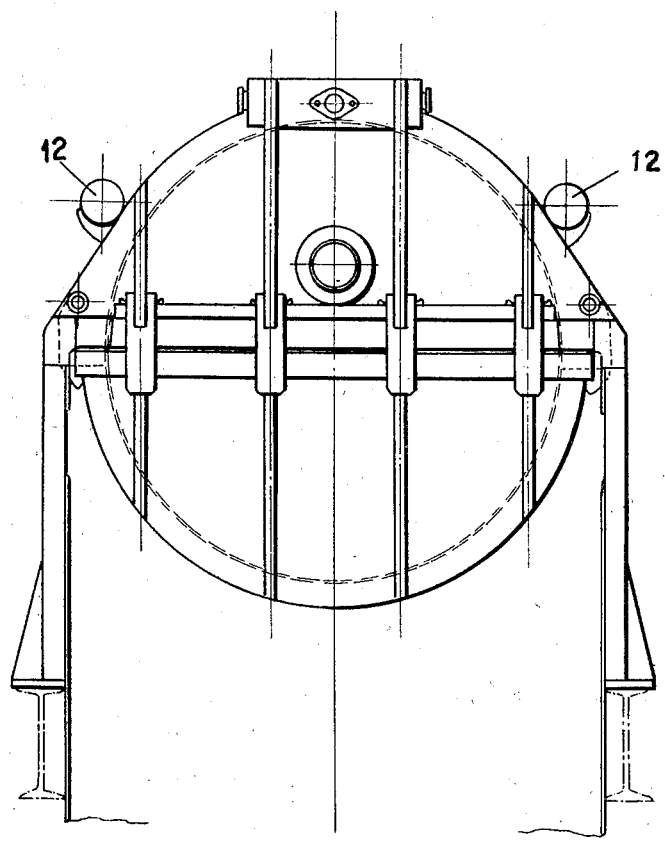

INVENTOR:
DARIO TEATINI
BY K. H. Mayr
ATTORNEY.

United States Patent Office 2,780,364
Patented Feb. 5, 1957

2,780,364
FILTER

Dario Teatini, Milan, Italy

Application June 16, 1954, Serial No. 437,204

Claims priority, application Italy June 16, 1953

9 Claims. (Cl. 210—182)

The present application relates to a filter for turbid liquids, more particularly to a filter having filter leaves whose position can be changed.

For the filtration of liquids containing substances in suspension, the following filters are known:

(a) Filters with chambers constituted by a plurality of filter leaves (press-filters);

(b) Filters with fixed or rotating spaced filter leaves in which the spacing of the leaves is not changed, the filter leaves being held in a pressure envelope (envelope-filters);

(c) Filters having a rotating cylinder, partially immersed in the liquid that must be filtered (continuous filters).

The "continuous filter" is used with advantage only for filtering liquids saturated with solid substances having particular physical characteristics.

The "envelope-filter" presents the advantage of preventing the escape of the liquid by means of a hermetically sealed casing. The envelope filter, however, affords only the formation of muddy residues.

Formation of solid cakes and discharge thereof after they have been removed from the filter elements is possible only with the press filter, which comprises individual chambers, because the filter elements can be successively removed for cleaning. This cleaning operation, however, must be done by hand, and requires much labor and very accurate work. Since the different chambers must be sealed from one another by the filter material, the latter must be firmly compressed between the hot surfaces of the filter leaves whereby the filter material is quickly worn, causing leakages.

In spite of these shortcomings, the press-filter is extensively used.

It is an object of the present invention to provide a filter which combines the advantages of the press-filter with those of the envelope filter and which avoids their disadvantages.

The novel features which are considered characteristic of the invention are set forth with particularity in the appended claims. The invention itself however and additional objects and advantages thereof will best be understood from the following description of embodiments thereof, when read in conjunction with the accompanying drawing in which:

Figs. 5 and 6 are part cross sectional views of two modifications of a filter leaf according to the invention;

Fig. 7 is a schematic side view of a modified filter according to the invention;

Fig. 8 is a diagrammatic end view of the filter shown in Fig. 7;

The same numerals designate the same parts in all figures.

Figure 1:
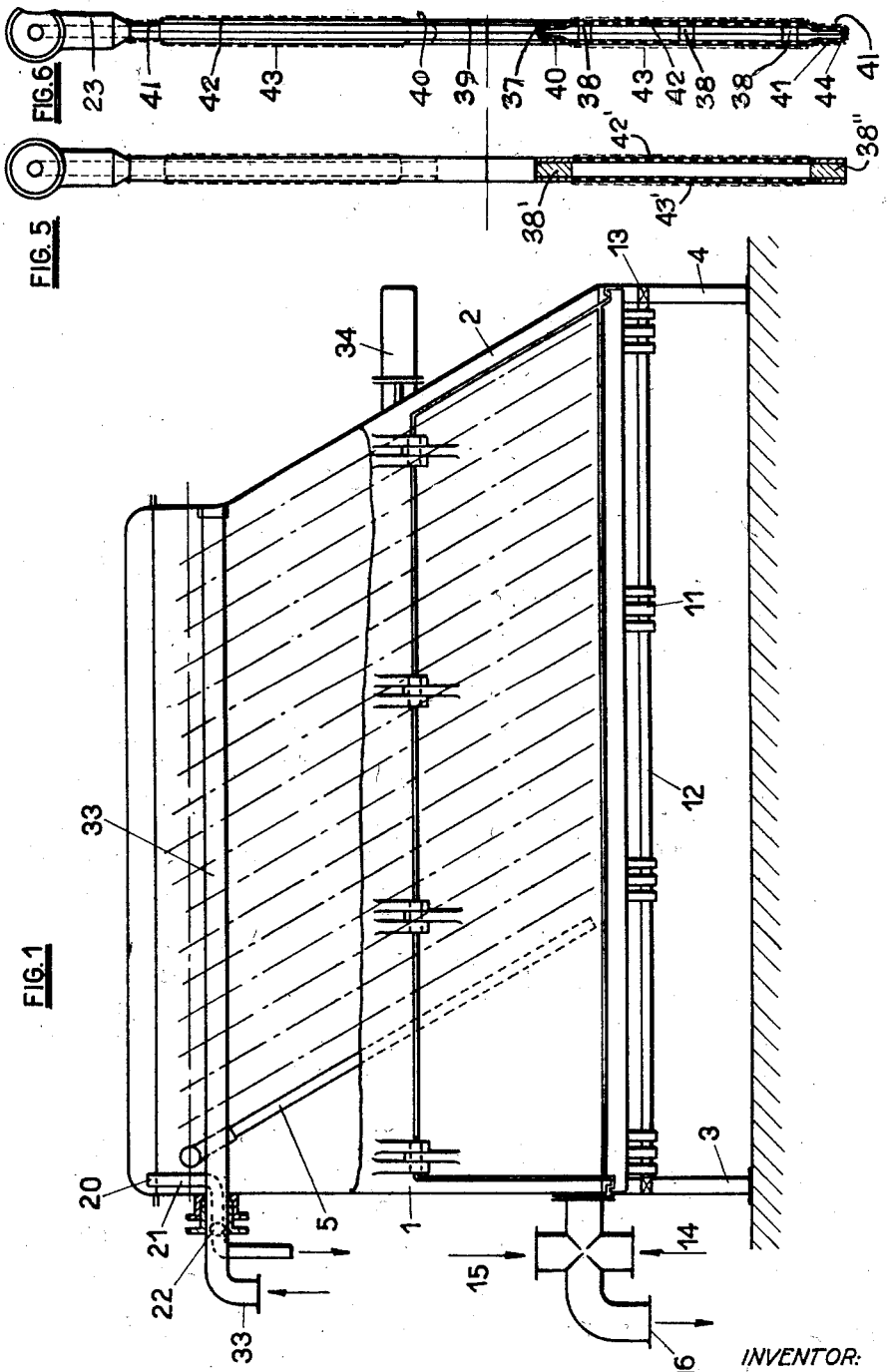
Fig. 1 is a schematic side view of a filter according to the invention, a portion of the upper part being broken off.
Figure 2:
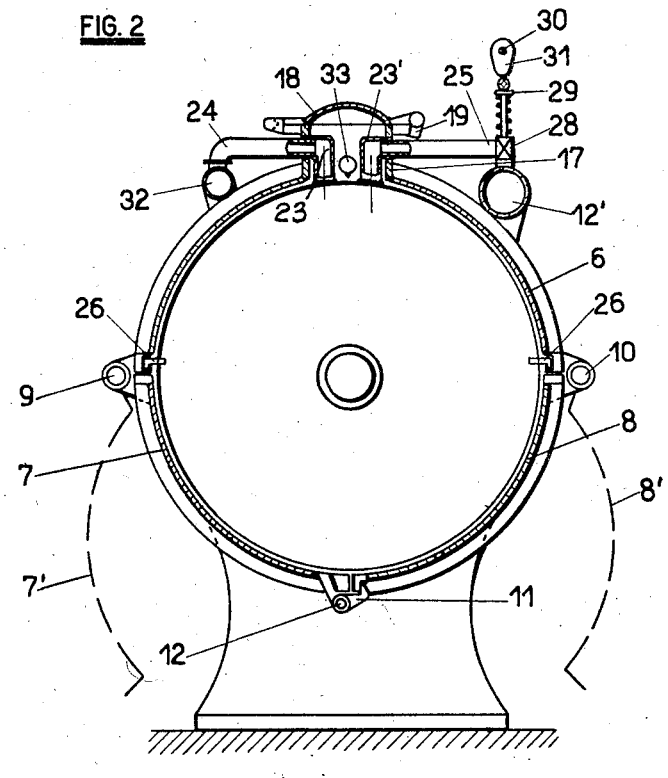
Fig. 2 is a cross section of the filter shown in Fig. 1.

Referring more particularly to Figs. 1 and 2 of the drawing, the substantially cylindrical casing is divided into three parts: An upper part 6 including heads 1 and 2 for closing the ends of the casing and being supported by feet 3 and 4, one of the heads (1) being vertical, and the other head (2) being inclined; and two lower parts 7 and 8 which are individually hinged to the upper part 6, the hinges having pivots 9 and 10, respectively. The lower ends of the parts 7 and 8 can be interconnected by hooks 11 fast on a shaft 12 which is rotatably supported by a stationary part of the device. The ends of the shaft 12 have square heads for revolving the shaft and the hooks 11 by means of a suitable key.

A four-way connector is mounted on the head 1 forming an inlet 15 for the turbid liquid, an inlet 14 for hot water for washing the filter, and an outlet 16 for discharging the filter. Each conduit connected with the connector is provided with a valve (not shown).

On top of the casing is a rectangular box 17 extending parallel to the longitudinal axis of the casing. The box is covered by a lid 18 which is hinged to the box and can be secured in closed position by means of hooks 19.

Figure 3:
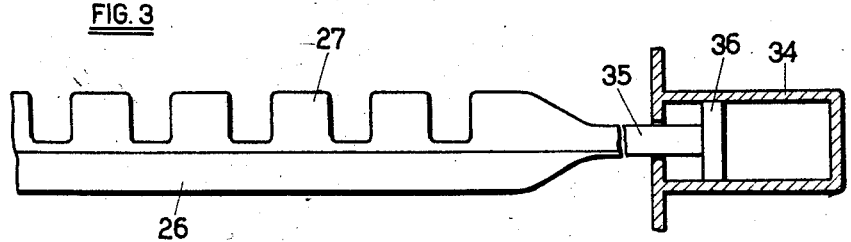
Fig. 3 illustrates, partly in section, a device for changing the position of the filter leaves.
Figure 4:
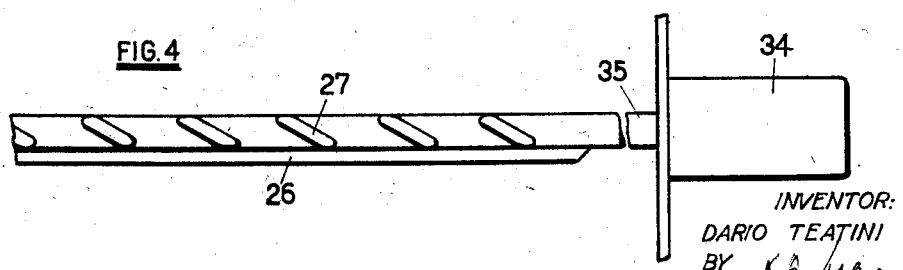
Fig. 4 illustrates the device shown in Fig. 3 viewed at a right angle to the view of Fig. 3.

An angular pipe 21 provided with a valve 22 connects the inside of the top of the part or box 17 with the outside and serves as an air vent, the air entering the pipe 21 at 20. Pairs of swingable, hollow supports 23 and 23', one pair of each filter leave 5, is placed inside of the box 17. The filter leaves have an elliptical shape fitting into the cylindrical interior of the casing when in the inclined position shown in Fig. 1. Pipes 24 and 25 extend in opposite direction into the box 17 transversely to the longitudinal axis of the latter. The ends of the pipes 24 and 25 extend into the hollow supports 23 and 23', respectively, forming pivots for the supports 23 and 23'. The pipes 24 and 25 serve as outlet for the filtered liquid and as inlet for washing liquid. To the head 2 hydraulic or pneumatic cylinders 34 (Figs. 3 and 4) are connected for longitudinally moving two parallel and diametrically oppositely positioned rods 26. The ends 35 of the latter are provided with pistons 36 individually movable in the cylinders 34. The rods 26 are provided with teeth 27 extending between neighboring filter leaves with a suitable clearance. Upon longitudinal movement of the two rods 26 in opposite direction the filter leaves 5 are turned without changing their distance and parallelism.

The outlet pipes for the filtered liquid which are connected with the hollow supports 23' are individually provided with valves 28 which are individually held in open position by means of springs 29. The valves 28 connect the pipes 25 with a header 12'.

A rotatably supported cam shaft 30 placed parallel to the longitudinal axis of the casing is provided with cams 31 for simultaneously closing every other of the valves 28 pertaining to the filter leaves of odd numbers, upon rotation of the shaft 30.

The supports 23 for the filter leaves of odd numbers are individually connected by the pipes 24 with a distributor or header 32 for the washing liquid, the distributor being provided with a valve, not shown.

The pivot pipes 24 and 25 can be individually pulled out, affording insertion or removal of the filter leaves through the lower part of the casing.

A washing out pipe 33 extends longitudinally through the box 17 and is provided with as many apertures or sets of apertures as there are spaces between the filter leaves. The pipe 33 can be rotated from the outside of the box 17 to place the apertures or nozzles in such a position that the pressure liquid is discharged through the nozzles in such a direction as to effectively clean the filter material. Each of the elliptic filter leaves is formed by two plates 42 and 43 which are perforated and shaped as shown in Fig. 6. The plates have an aperture 39 in the center and are interconnected at their edges 37 and 44 by soldering; they are spaced from each other by means of spacers 38 for forming a chamber receiving and removing the filtered liquid and air and for introducing a cleaning liquid. Two hollow supports 23 and 23', described supra, are connected with each filter leaf. The outside surface of the plates 42 and 43 is covered with filter material such as cloth which is indicated by dotted lines in Fig. 6 and which is held by rings 40 and 41. The aperture 39 affords circulation of turbid liquid between the spaces between the filter leaves.

Fig. 5 shows a modified design of a filter leaf in which the plates 42' and 43' are plane and soldered to annular spacers 38' and 38".

The filter is operated as follows:

When the casing is closed (solid lines in Fig. 1), the elliptic filter leaves are in inclined position and ready for filtering or washing. The turbid liquid enters the casing through inlet 14 which the air valve 22 is open. The valve 22 is closed when the turbid liquid fills the casing.

Continued supply of liquid raises the pressure in the casing, causing the liquid to pass through the cloth into the chambers formed by the plates 42 and 43. The so filtered liquid leaves the filter leaves through the supports 23' and the pipes 25 whereupon it is collected in a manifold 12', all valves 28 being open. The filtered out substances collect between the filter leaves and form cakes which, if completely filling the spaces between the filter leaves, terminate the filtration phase. Thereupon, the supply of turbid liquid is interrupted and washing liquid, for example hot water, is supplied through the inlet 15. The washing water forces the liquid to be filtered and still contained in the spaces between the filter leaves and in the pores of the cakes into the filter leaves. For washing the inside of the filter leaves, the hot water supply through the inlet 15 is interrupted and the odd numbered valves 28 are closed whilst the valve (not shown) in the distributor 32 is opened, introducing washing liquid to the inside of the filter leaves from the top of the casing.

Figure 10:
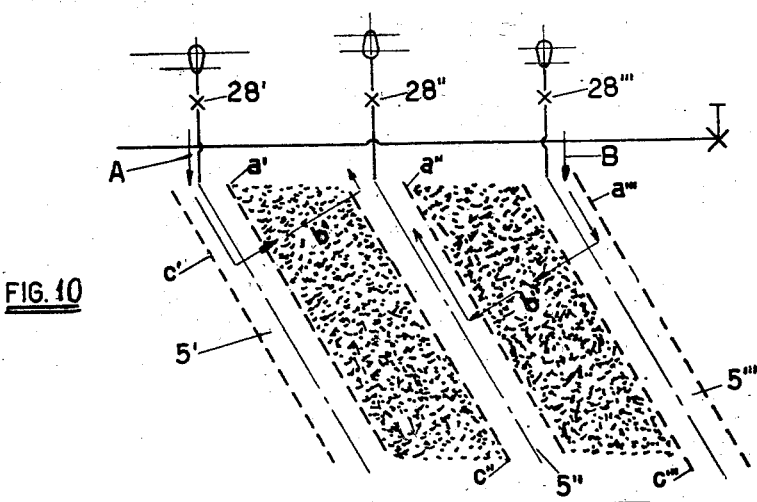

The liquid coming from the distributor 32 enters the inside of the odd numbered filter leaves 5' through the pipes 24 in the direction of the arrow A in Fig. 10, passes through the cloth $a'$ covering one outside surface of a filter leaf and permeates the cake $b'$ wherefrom it passes through the cloth $c''$ into the interior of an even numbered filter leaf 5'', leaving through pipe 25 and flowing therefrom into the manifold 12', the valve 28'' being open. The valve 28' pertaining to the odd numbered filter leaf 5' is closed at this time.

Analogously, the washing liquid enters through a pipe 24 connected with the odd numbered filter leaf 5''' in the direction of the arrow B and flows into the manifold 12' through the cloth $c'''$ and through the cake $b''$.

A part of the washing liquid entering the filter leaf 5''' passes through the cloth $a'''$ and permeates the adjacent cake, wherefrom it passes into an even numbered filter leaf, leaving the latter in the same manner as the water leaves the filter leaf 5''.

After completion of the aforedescribed two-phase washing out operation, the shaft 12 is revolved, opening the hooks 11 so that the casing portions 7 and 8 move by gravity into the position indicated in Fig. 2 by dash lines 7' and 8'. Thereupon, the cylinders 34 are supplied with a pressure fluid for longitudinally moving the rods 26 and swinging the filter leaves from the inclined position shown in Fig. 1 to a vertical position.

Figure 9:
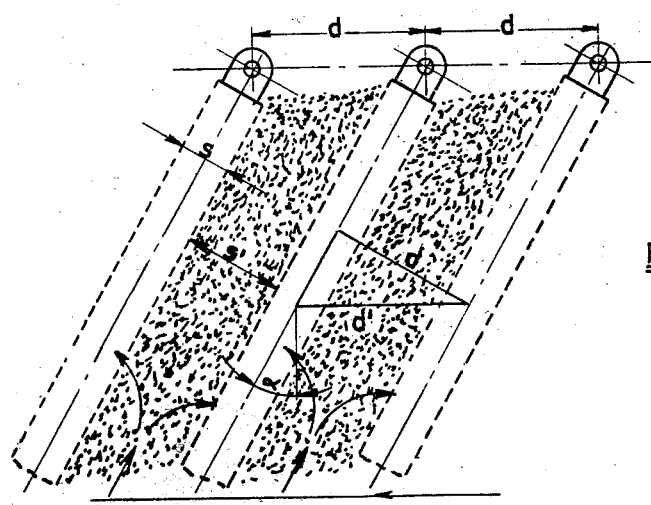
Figs. 9 to 11 are diagrams illustrating the flow of cleaning liquid at different positions of the filter leaves.
Figure 11:
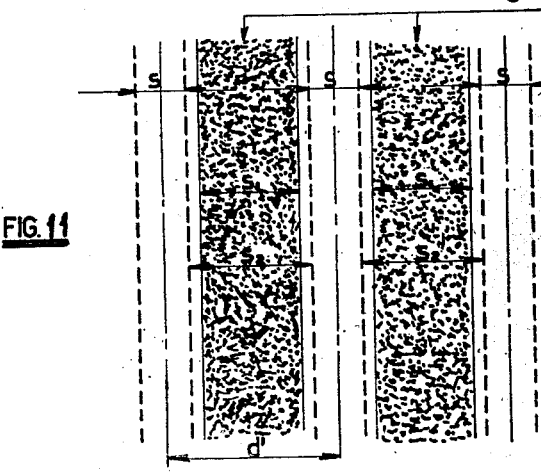

As can be seen in Fig. 9, if $d$ represents the distances between the suspension fulcrums of the filter leaves and $d'$ designates the distance between the center lines of the filter leaves when they are inclined at an angle $a$ with respect to the vertical, the distance between the center lines of the filter leaves becomes squal to the distance $d$ between the fulcrums on which they are suspended when moved into the vertical position (Fig. 11). Therefore, the chambers accommodating the cakes become gradually wider during the movement of the leaves from the inclined into the vertical position, so that the cakes can drop out by gravity.

The pressure water introduced through the nozzles in the pipe 33 thoroughly washes the cloth covering the outside of the filter leaves. Thereupon, the leaves are moved into the inclined position and the casing is closed, making the filter ready for the subsequent filtering operation.

Instead of suspending the filter leaves from the top of the casing, they may be provided with tubular or solid pivots which are placed horizontally or vertically at other parts of the casing without departing from the scope of the invention.

As a modification, the manifold 12' and the distributor 32 may be used for introducing the turbid liquid, using the manifold 32 by proper manipulation of a three-way valve, not shown, as a distributor for the washing liquid for the odd numbered filter leaves.

Figs. 7 and 8 illustrate a modification in which the casing has a top part 45 having upper heads 46 and 47 at its ends which are supported by uprights 48 and 49, respectively. The lower casing part 50 is rotatable on a hinge 51 interconnecting the lower part 53 with the upper part 46 of the head at the right side of the casing. The lower casing part 50 is opened and closed by means of a servomotor 52 positioned underneath the casing. The lower part of the casing has the shape of a trough which facilitates washing away the mushy cakes by water when the casing is opened. A particular advantage of this design is that both lower semicircular head parts 53 and 54 are in inclined position, considerably reducing the dead space in the closed casing and improving the filtering and washing effects.

It is advisable to incline the head part 54 40° with respect to the vertical and to incline the head part 53 30° for facilitating discharge of the mushy cakes when the lower casing part is in open position forming a trough.

Sealing of the upper casing part 45 against the lower part 50 is extremely simple since the sealing surfaces have a rectangular configuration and are in a horizontal plane.

I claim:

1. A filter for turbid liquids comprising a casing having a substantially horizontal longitudinal axis, said casing having a lower part adapted to be opened, a plurality of parallel and spaced filter leaves individually swingably supported within said casing, the periphery of each filter leaf closely following the inside wall surface of said casing and the planes of said filter leaves being inclined relative to the vertical when the casing is closed and the filter leaves are in filtering position, and spacing and actuating means movable in said casing and engaging said filter leaves for swinging said filter leaves from the inclined (filtering) position to a vertical position for cleaning and back into the inclined position, and for maintaining said filter leaves in parallel and spaced relation at all positions effected by said spacing and actuating means, the spacing being wider when the leaves are in vertical (cleaning) position than when in inclined (filtering) position.

2. A filter as defined in claim 1, in which said casing is substantially cylindrical and said filter leaves are elliptic.

3. A filter as defined in claim 1, including a washing water supply pipe disposed within said casing above said filter leaves and extending substantially parallel to the longitudinal axis of said casing, said pipe being provided with apertures for spraying washing water onto said filter leaves.

4. A filter as defined in claim 1 in which the lower part of said casing is longitudinally split into two halves, each half being longitudinally hinged to the upper part of the casing.

5. A filter as defined in claim 1 in which said casing has a closing head at each end, said heads being horizontally split, the upper part of each head closing the ends of the upper part of the casing and the lower part of each head closing the ends of the lower part of the casing, and the lower part of one head of said lower part of the casing being hinged to the upper part of the respective head.

6. A filter according to claim 5 in which the head whose lower part is hinged to the upper part is inclined with respect to the vertical, and the lower part of the other head is inclined with respect to the vertical, the upper part of the other head being vertical.

7. A filter for turbid liquids comprising a casing having a substantially horizontally longitudinal axis and having a lower part adapted to be opened, a plurality of parallel and spaced filter leaves within said casing, pivot means individually swingably supporting said filter leaves within said casing, the periphery of each filter leaf closely following the inside wall surface of said casing and the planes of said filter leaves being inclined relative to the vertical when the casing is closed and the filter leaves are in filtering position, and spacing and actuating means movable in said casing and engaging said filter leaves for swinging said filter leaves from the inclined (filtering) position to a vertical position for cleaning and back into the inclined position, and for maintaining said filter leaves in parallel and spaced relation at all positions effected by said spacing and actuating means, the spacing being wider when the leaves are in vertical (cleaning) position than when in inclined (filtering) position, said filter leaves individually including two parallel plates joined together at their peripheries and forming a chamber, said pivot means being hollow and interiorly communicating with said chambers and extending outside of said casing for conducting a liquid into and from said chambers.

8. A filter for turbid liquids comprising a casing having a substantially horizontal longitudinal axis and having a lower part adapted to be opened, a plurality of parallel and spaced filter leaves within said casing, pairs of pivot means individually swingably supporting said filter leaves within said casing, the periphery of each filter leaf closely following the inside wall surface of said casing and the planes of said filter leaves being inclined relative to the vertical when the casing is closed and the filter leaves are in filtering position, and spacing and actuating means movable in said casing and engaging said filter leaves for swinging said filter leaves from the inclined (filtering) position to a vertical position for cleaning and back into the inclined position, and for maintaining said filter leaves in parallel and spaced relation at all positions effected by said spacing and actuating means, the spacing being wider when the leaves are in vertical (cleaning) position than when in inclined (filtering) position, said filter leaves individually including two parallel plates joined together at their peripheries and forming a chamber, said pivot means being hollow and interiorly communicating with said chambers and extending outside of said casing for conducting a liquid into and from said chambers, two headers disposed outside and extending substantially parallel to the longitudinal axis of said casing, one pivot means of each pair being connected to one of said headers for communication therewith, and the other pivot means of each pair being connected with the other of said headers for communication therewith.

9. A filter according to claim 8 including a valve in each of said pivot means which are connected with one of said headers, a shaft disposed outside and extending substantially parallel to the longitudinal axis of said casing, and cams mounted on said shaft for cooperation with said valves for closing every other of said valves and affording opening of the remaining valves.

References Cited in the file of this patent

UNITED STATES PATENTS

| | | |
|---|---|---|
| Re. 12,807 | Burt | June 9, 1908 |
| 1,070,473 | Howson | Aug. 19, 1913 |
| 1,144,854 | Lass | June 29, 1915 |
| 1,292,342 | McGlaughlin | Jan. 21, 1919 |
| 1,305,317 | Sweetland | June 3, 1919 |
| 1,858,160 | Leek | May 10, 1932 |